(12) United States Patent
Yuwaki et al.

(10) Patent No.: US 11,485,061 B2
(45) Date of Patent: *Nov. 1, 2022

(54) PLASTICIZATION DEVICE, THREE-DIMENSIONAL SHAPING DEVICE, AND INJECTION MOLDING DEVICE

(71) Applicant: Seiko Epson Corporation, Tokyo (JP)

(72) Inventors: Kohei Yuwaki, Tsukuba (JP);
Kazuhide Nakamura, Asahi (JP);
Koichi Saito, Matsumoto (JP)

(73) Assignee: SEIKO EPSON CORPORATION

( * ) Notice: Subject to any disclaimer, the term of this patent is extended or adjusted under 35 U.S.C. 154(b) by 181 days.

This patent is subject to a terminal disclaimer.

(21) Appl. No.: 17/004,307

(22) Filed: Aug. 27, 2020

(65) Prior Publication Data

US 2021/0060840 A1 Mar. 4, 2021

(30) Foreign Application Priority Data

Aug. 29, 2019 (JP) .............................. JP2019-156433

(51) Int. Cl.
*B29C 45/46* (2006.01)
*B29C 64/209* (2017.01)
(Continued)

(52) U.S. Cl.
CPC ............ *B29C 45/464* (2013.01); *B22F 3/225* (2013.01); *B28B 1/001* (2013.01); *B28B 1/24* (2013.01);
(Continued)

(58) Field of Classification Search
CPC ... B29C 45/464; B29C 64/209; B29C 64/314; B29C 45/47; B29C 64/118; B22F 3/225;
(Continued)

(56) References Cited

U.S. PATENT DOCUMENTS 3,375,549 A    4/1968  Geyer
3,378,549 A *  4/1968  Edwards ................ A01N 45/00
                                          552/541

(Continued)

FOREIGN PATENT DOCUMENTS

JP         2010-241016 A      10/2010

*Primary Examiner* — Nahida Sultana
(74) *Attorney, Agent, or Firm* — Harness, Dickey & Pierce, P.L.C.

(57) ABSTRACT

A plasticization device includes: a rotor rotated by a drive motor and having a groove forming surface in which a first groove portion is formed along a rotation direction; a rotor case configured to accommodate the rotor; a barrel facing the groove forming surface and having a through hole; a first heating unit configured to heat the rotor or the barrel; and a cooling mechanism configured to cool a side surface of the rotor. In the plasticization device, a material supplied between the first groove portion and the barrel is plasticized by rotation of the rotor and heating by the first heating unit to flow out from the through hole, and the side surface of the rotor has a material guiding port configured to guide the material to the first groove portion, and a second groove portion configured to feed the material supplied between the rotor and the rotor case to the material guiding port.

10 Claims, 8 Drawing Sheets

(51) Int. Cl.
  *B29C 64/314* (2017.01)
  *B33Y 30/00* (2015.01)
  *B22F 3/22* (2006.01)
  *B28B 1/24* (2006.01)
  *B28B 1/00* (2006.01)
  *B28B 17/02* (2006.01)
  *B33Y 40/10* (2020.01)

(52) U.S. Cl.
  CPC .......... *B28B 17/026* (2013.01); *B29C 64/209* (2017.08); *B29C 64/314* (2017.08); *B33Y 30/00* (2014.12); *B33Y 40/10* (2020.01)

(58) Field of Classification Search
  CPC .. B22F 2998/10; B22F 2999/00; B22F 10/10; B22F 10/18; B22F 10/22; B22F 12/53; B28B 1/001; B28B 1/24; B28B 17/026; B33Y 30/00; B33Y 40/10; B33Y 70/00; B33Y 10/00; Y02P 10/25
  See application file for complete search history.

(56) References Cited

U.S. PATENT DOCUMENTS

| | | | |
|---|---|---|---|
| 3,790,328 A * | 2/1974 | Maxwell | B29C 45/50 |
| | | | 425/207 |
| 4,746,478 A | 5/1988 | Fujisaki et al. | |
| 4,779,989 A | 10/1988 | Barr | |
| 4,872,261 A | 10/1989 | Sanyal et al. | |
| 4,981,364 A | 1/1991 | Geyer | |
| 5,855,020 A | 12/1998 | Kirsch | |
| 5,855,929 A * | 1/1999 | Geyer | B29C 48/686 |
| | | | 366/89 |
| 2012/0056342 A1 | 3/2012 | Koslow | |

* cited by examiner

PLASTICIZATION DEVICE, THREE-DIMENSIONAL SHAPING DEVICE, AND INJECTION MOLDING DEVICE

The present application is based on, and claims priority from JP Application Serial Number 2019-156433, filed Aug. 29, 2019, the disclosure of which is hereby incorporated by reference herein in its entirety.

BACKGROUND

1. Technical Field

The present disclosure relates to a plasticization device, a three-dimensional shaping device, and an injection molding device.

2. Related Art

For example, JP-A-2010-241016 discloses an injection molding device including a rotor having a groove forming surface in which a spiral groove is formed and a barrel in which a through hole is formed in a center. In the injection molding device, a material is softened and melted between the groove forming surface of the rotor and the barrel, and is injected into a mold through the through hole provided in the barrel.

In such an injection molding device, the material is conveyed toward the center while the material is maintained in a form of pellet at an outer peripheral portion of the groove forming surface, so that a force is obtained with which the material melted at a central portion of the groove forming surface is pressure-fed from the through hole of the barrel. Therefore, when the material cannot be stably maintained in the form of pellet at the outer peripheral portion of the groove forming surface, an injection amount of the material may vary. Such a problem is not limited to the injection molding device, but is also a common problem for a plasticization device for plasticizing the material using a rotor and a barrel, a three-dimensional shaping device for shaping a three-dimensional shaped object with the material plasticized using the rotor and the barrel, and the like.

SUMMARY

According to one aspect of the present disclosure, a plasticization device is provided. The plasticization device includes: a rotor rotated by a drive motor and having a groove forming surface in which a first groove portion is formed along a rotation direction; a rotor case configured to accommodate the rotor; a barrel facing the groove forming surface and having a through hole; a first heating unit configured to heat the rotor or the barrel; and a cooling mechanism configured to cool a side surface of the rotor, in which a material supplied between the first groove portion and the barrel is plasticized by rotation of the rotor and heating by the first heating unit to flow out from the through hole, and the side surface of the rotor has a material guiding port configured to guide the material to the first groove portion, and a second groove portion configured to feed the material supplied between the rotor and the rotor case to the material guiding port.

DESCRIPTION OF EXEMPLARY EMBODIMENTS

A. First Embodiment

Figure 1:
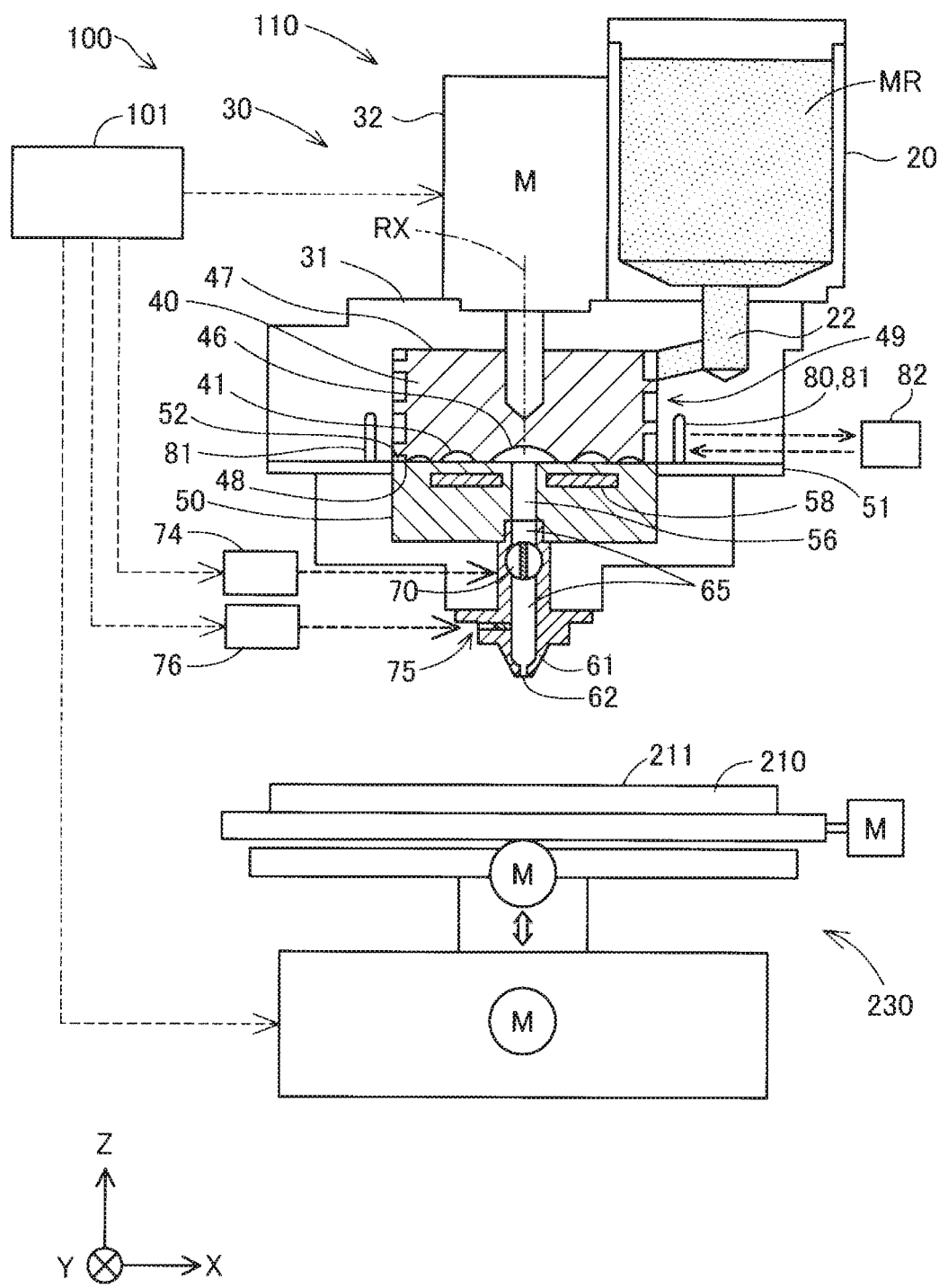
FIG. 1 is an explanatory diagram showing a schematic configuration of a three-dimensional shaping device according to a first embodiment.

FIG. 1 is an explanatory diagram showing a schematic configuration of a three-dimensional shaping device 100 according to a first embodiment. FIG. 1 shows arrows along X, Y, and Z directions orthogonal to each other. The X direction and the Y direction are directions along a horizontal direction and the Z direction is a direction along a vertical direction. In other figures, the arrows along the X, Y, and Z directions are appropriately shown. The X, Y, Z directions in FIG. 1 and the X, Y, Z directions in other figures represent the same direction.

The three-dimensional shaping device 100 includes a control unit 101, a plasticization device 110 that generates a shaping material to discharge the shaping material, a table 210 for shaping that serves as a base of a three-dimensional shaped object, and a moving mechanism 230 that controls a discharge position of the shaping material.

The control unit 101 controls an overall operation of the three-dimensional shaping device 100 to execute a shaping processing for shaping the three-dimensional shaped object. The control unit 101 is implemented by a computer including one or a plurality of processors and a main storage device. The control unit 101 performs various functions by executing a program read into the main storage device by the processor. A part of the functions of the control unit 101 may be implemented by a hardware circuit. In the shaping processing executed by the control unit 101, the plasticization device 110 and the moving mechanism 230 are controlled according to shaping data of the three-dimensional shaped object.

Under the control of the control unit 101, the plasticization device 110 discharges the melted shaping material in a form of paste to a target position on the table 210. The plasticization device 110 includes a material supply unit 20 that is a supply source of a material MR before being converted into the shaping material, a plasticization unit 30 that converts the material MR into the shaping material, a cooling mechanism 80 that cools a side surface 49 of a rotor 40, a nozzle 61 having a discharge port 62 configured to discharge the shaping material toward the table 210, a flow rate adjustment mechanism 70 that controls a discharge amount of the shaping material from the nozzle 61, and a suction unit 75 that suctions the shaping material to temporarily store the shaping material.

The material supply unit 20 supplies the material MR for generating the shaping material to the plasticization unit 30. The material supply unit 20 is implemented by, for example, a hopper that accommodates the material MR. The material supply unit 20 is coupled to the plasticization unit 30 via a communication path 22. In the present embodiment, the material MR is charged to the material supply unit 20 in a form of pellet. The communication path 22 is open near an upper portion of the side surface 49 of the rotor 40 to be described later, and supplies a material toward an upper portion of the rotor 40. The material MR will be described later in detail.

The plasticization unit 30 plasticizes at least a part of the material MR supplied from the material supply unit 20 to generate the shaping material in the form of paste in which fluidity is exhibited, and guides the shaping material to the nozzle 61. The plasticization unit 30 includes a rotor case 31, a drive motor 32, the rotor 40, a barrel 50, and a first heating unit 58. The rotor 40 is also referred to as a "flat screw". The plasticization unit 30 may plasticize the entire material MR, or for example, when the material MR contains a plurality of components, plasticize some of the components.

Figure 2:
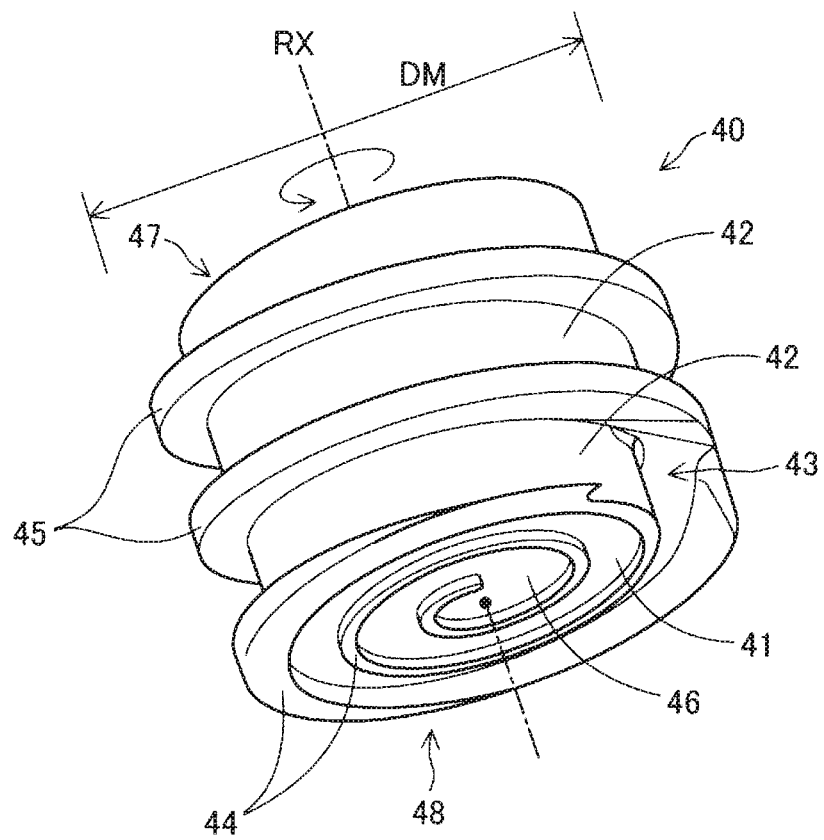
FIG. 2 is a perspective view of a rotor.

FIG. 2 is a perspective view of the rotor 40. The rotor 40 in the present embodiment has a substantially columnar shape, and includes a spiral flight portion 45 on an outer periphery thereof. In the present embodiment, a diameter DM of the rotor 40 is constant over the entire length along a rotation axis RX. In the present embodiment, the diameter of the rotor 40 is an outer diameter of the flight portion 45. As shown in FIG. 1, the rotor 40 is accommodated in the rotor case 31 having a cylindrical internal space for accommodating the rotor 40. An upper surface 47 of the rotor 40 is coupled to the drive motor 32. The rotor 40 rotates in the rotor case 31 centered on the rotation axis RX along the Z direction by a rotation drive force generated by the drive motor 32. The drive motor 32 is driven under the control of the control unit 101.

Figure 3:
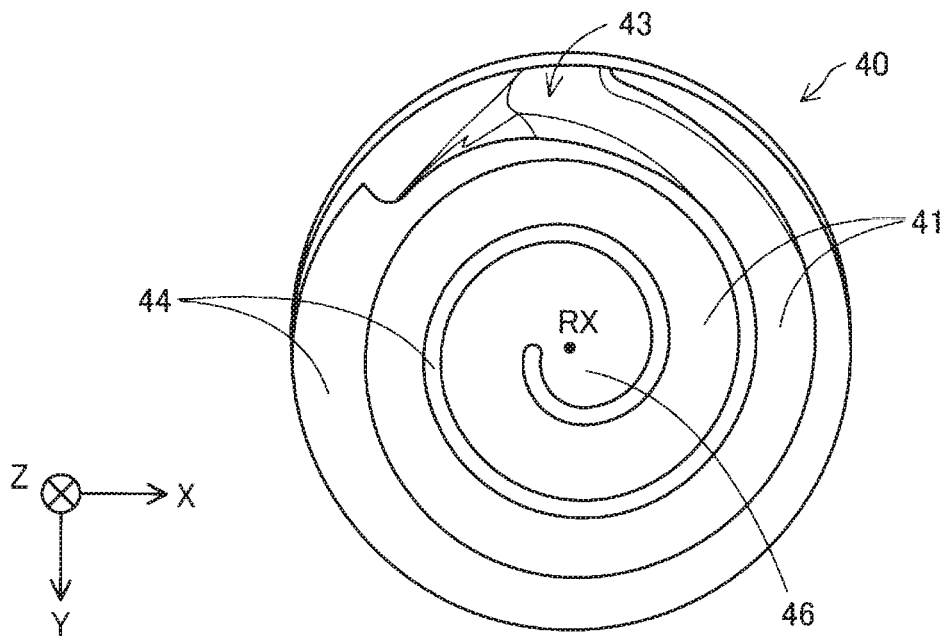
FIG. 3 is a bottom view of the rotor.

FIG. 3 is a bottom view of the rotor 40. Hereinafter, a lower surface of the rotor 40 is referred to as a groove forming surface 48. A first groove portion 41 is formed in the groove forming surface 48 of the rotor 40 along a rotation direction of the rotor 40. The first groove portion 41 forms a scroll groove. The first groove portion 41 extends from a central portion 46 toward the outer periphery of the rotor 40 in a form of swirl so as to draw an arc. The first groove portion 41 may be configured to extend spirally. The groove forming surface 48 is provided with a ridge portion 44 that forms a side wall portion of the first groove portion 41 and extends along the first groove portion 41.

Figure 4:
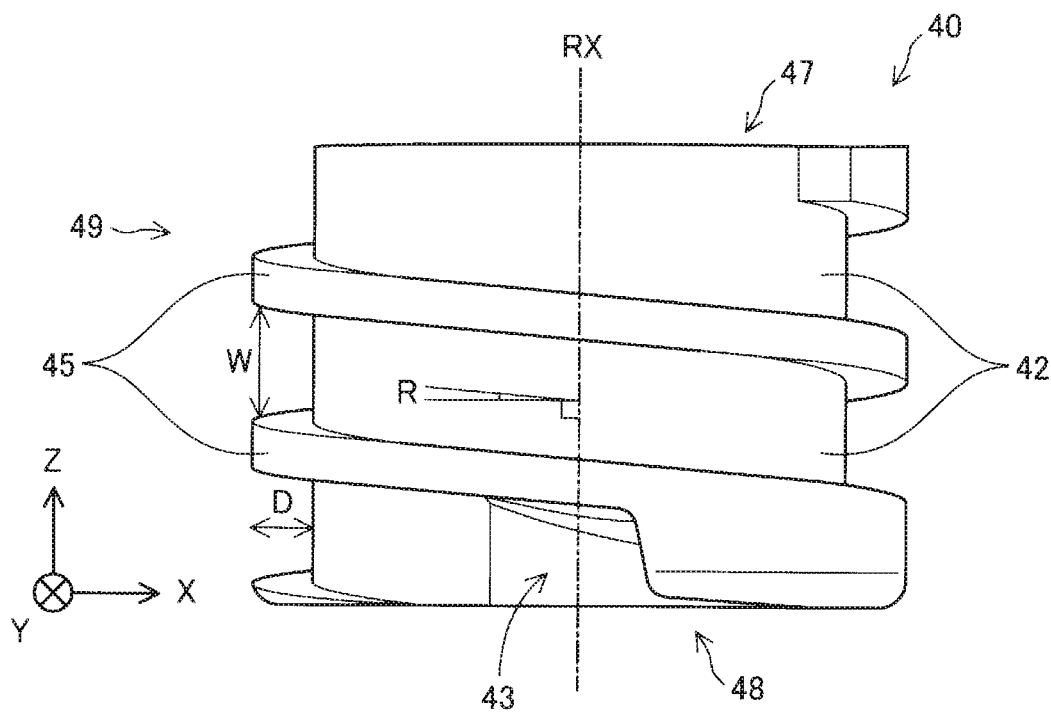
FIG. 4 is a side view of the rotor.

FIG. 4 is a side view of the rotor 40. The rotor includes a second groove portion 42 and a material guiding port 43 on the side surface 49 thereof. The second groove portion 42 is a groove portion formed between flight portions 45. In the present embodiment, the second groove portion 42 is spirally provided. The second groove portion 42 has a function of feeding, from the material supply unit 20, the material MR in the form of pellet supplied between the rotor 40 and the rotor case 31 to the material guiding port 43. The material guiding port 43 forms a recess that guides the material MR from the second groove portion 42 to the first groove portion 41.

In the present embodiment, a depth D, a groove width W, and an inclination angle R of the second groove portion 42 are constant. The inclination angle R is an inclination angle with respect to a plane orthogonal to the rotation axis RX. The inclination angle R in the present embodiment is an inclination angle at a center of the second groove portion 42 in a groove width direction. The inclination angle R in the present embodiment is an acute angle, for example, 5° to 45°. In the present embodiment, the groove forming surface 48 is orthogonal to the rotation axis RX. Therefore, the inclination angle R is also an inclination angle with respect to the groove forming surface 48.

As shown in FIGS. 2 to 4, in the present embodiment, one first groove portion 41, one second groove portion 42, and one material guiding port 43 are formed in the rotor 40. That is, the rotor 40 includes a set of the first groove portion 41, the second groove portion 42, and the material guiding port 43. In another embodiment, a plurality of sets of the first groove portion 41, the second groove portion 42, and the material guiding port 43 may be provided in the rotor 40.

As shown in FIG. 1, in the present embodiment, the cooling mechanism 80 for cooling the side surface 49 of the rotor 40 is provided inside the rotor case 31. In the present embodiment, the cooling mechanism 80 includes a cooling flow path 81 through which a refrigerant flows. A pump 82 for pressure-feeding the refrigerant is coupled to the cooling flow path 81. Water or air is used as the refrigerant. The cooling flow path 81 surrounds a periphery of the rotor 40 inside the rotor case 31. In the present embodiment, a groove is formed in the rotor case 31 from a lower surface side, and the cooling flow path 81 is formed by closing the groove from below by a lid member 51. The cooling mechanism 80 may be formed by a spiral cooling flow path along the second groove portion 42.

Figure 5:
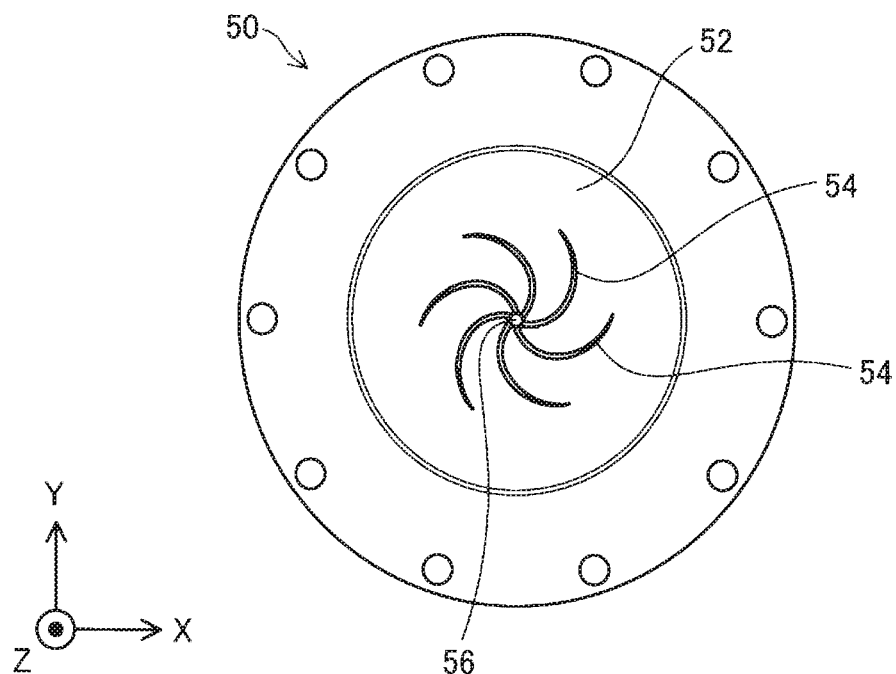
FIG. 5 is a top view of a barrel.

FIG. 5 is a top view of the barrel 50. The barrel 50 is disposed below the rotor 40. An upper surface of the barrel 50 faces the groove forming surface 48 of the rotor 40. Hereinafter, the upper surface of the barrel 50 is referred to as a "screw facing surface 52". A through hole 56 for supplying the shaping material to the nozzle 61 is formed at a center of the screw facing surface 52.

A plurality of guide grooves 54 coupled to the through hole 56 and extending from the through hole 56 towards an outer periphery in the form of swirl are formed in the screw facing surface 52. The plurality of guide grooves 54 have a function of guiding the shaping material flowing into the central portion 46 of the rotor 40 to the through hole 56.

As shown in FIG. 1, the first heating unit 58 for heating the barrel 50 to plasticize the material MR is embedded in the barrel 50. The first heating unit 58 is controlled by the control unit 101. The first heating unit 58 may be disposed below the barrel 50 instead of being embedded in the barrel 50.

The material MR supplied to the second groove portion 42 provided on the side surface 49 of the rotor 40 is guided through the material guiding port 43 to the first groove portion 41 provided on the lower surface of the rotor 40 while being cooled by the cooling mechanism 80. The material guided to the first groove portion 41 flows along the first groove portion 41 by rotation of the rotor 40 while being melted between the first groove portion 41 and the barrel 50, and is, as the shaping material, guided to the central portion 46 of the groove forming surface 48. The shaping material in the form of paste flowing into the central portion 46 flows out to the nozzle 61 through the through hole 56 provided at a center of the barrel 50.

The nozzle 61 is coupled to the through hole 56 of the barrel 50 through a flow path 65 coupling the plasticization unit 30 and the nozzle 61. The nozzle 61 discharges the shaping material generated in the plasticization unit 30 from the discharge port 62 at a tip end toward the table 210. In the present embodiment, the flow path 65 extends along the Z direction, and the flow path 65 and the nozzle 61 are arranged along the Z direction.

The table 210 is disposed at a position facing the discharge port 62 of the nozzle 61. The table 210 has a shaping surface 211 on which the three-dimensional shaped object is shaped. In the present embodiment, the shaping surface 211 is horizontal, that is, parallel to the X and Y directions.

The moving mechanism 230 is configured to change a relative position between the table 210 and the nozzle 61. In the present embodiment, a position of the nozzle 61 is fixed, and the table 210 is moved by the moving mechanism 230. The moving mechanism 230 includes a three-axis positioner that moves the table 210 in directions of three axes in the X, Y, and Z directions by drive forces of three motors. The moving mechanism 230 changes a relative positional relationship between the nozzle 61 and the table 210 under the control of the control unit 101.

In another embodiment, instead of a configuration in which the table 210 is moved by the moving mechanism 230, a configuration may be adopted in which the nozzle 61 is moved by the moving mechanism 230 with respect to the table 210 in a state where a position of the table 210 is fixed. In addition, a configuration may be adopted in which the table 210 is moved by the moving mechanism 230 in the Z direction and the nozzle 61 is moved by the moving mechanism 230 in the X and Y directions, or a configuration may be adopted in which the table 210 is moved by the moving mechanism 230 in the X and Y directions and the nozzle 61 is moved by the moving mechanism 230 in the Z direction. The relative positional relationship between the nozzle 61 and the table 210 can be changed even in these configurations.

The flow rate adjustment mechanism 70 rotates in the flow path 65 to change an opening degree of the flow path 65. In the present embodiment, the flow rate adjustment mechanism 70 is implemented by a butterfly valve. The flow rate adjustment mechanism 70 is driven by a first drive unit 74 under the control of the control unit 101. The first drive unit 74 is implemented by, for example, a stepping motor. The control unit 101 can control a rotation angle of the butterfly valve to adjust a flow rate of the shaping material flowing from the plasticization unit 30 to the nozzle 61, that is, the flow rate of the shaping material discharged from the nozzle 61.

The suction unit 75 is coupled between the flow rate adjustment mechanism 70 and the discharge port 62 in the flow path 65. When the supply of the shaping material from the nozzle 61 is stopped, the suction unit 75 temporarily suctions the shaping material in the flow path 65, thereby preventing tailing of the shaping material drooping from the nozzle 61 as pulling a thread. In the present embodiment, the suction unit 75 is implemented by a plunger. The suction unit 75 is driven by a second drive unit 76 under the control of the control unit 101. The second drive unit 76 includes, for example, a stepping motor or a rack and pinion mechanism that converts a rotational force of the stepping motor into a translational motion of the plunger.

Figure 6:
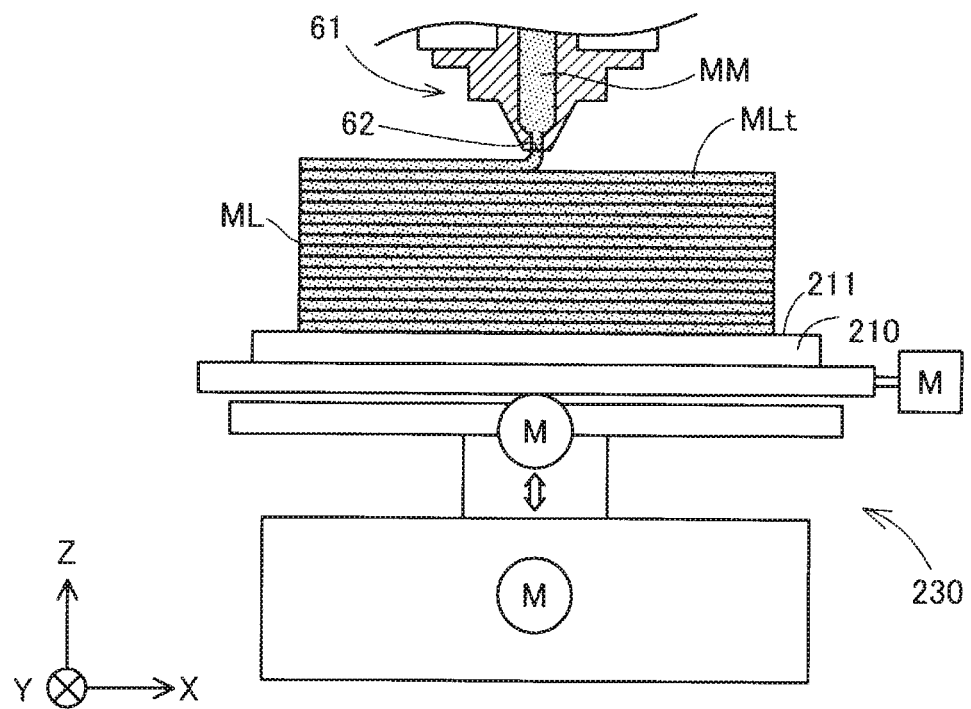
FIG. 6 is diagram schematically showing a state where a three-dimensional shaped object is shaped.

FIG. 6 is a diagram schematically showing a state where the three-dimensional shaped object is shaped by the three-dimensional shaping device 100. In the three-dimensional shaping device 100, as described above, a shaping material MM is generated in the plasticization unit 30. Then, while the nozzle 61 is moved in a direction along the shaping surface 211 of the table 210 by the moving mechanism 230, the shaping material MM is discharged from the nozzle 61 toward the shaping surface 211 of the table 210.

Here, a layer formed of the shaping material MM discharged by a shaping processing when the nozzle 61 is positioned at the same height with respect to the shaping surface 211 of the table 210 is referred to as a "shaping layer ML". The control unit 101 moves the nozzle 61 in the Z direction, and further stacks, by the next shaping processing, the shaping material MM on the shaping layer ML formed by the shaping processing so far, so as to shape a three-dimensional shaped object. That is, the three-dimensional shaping device 100 manufactures a three-dimensional shaped object by stacking shaping layers ML to any number of layers.

In the three-dimensional shaping device 100 of the present embodiment described above, the second groove portion 42 and the material guiding port 43 are formed on the side surface 49 of the rotor 40 of the plasticization device 110, and the material MR in the form of pellet is supplied, through the second groove portion 42 and the material guiding port 43, between the first groove portion 41 formed in the groove forming surface 48 and the barrel 50. According to such a configuration, since the material MR is temporarily stored in the second groove portion 42, it is possible to stably supply the material MR to the first groove portion 41 rather than directly supplying the material MR from the communication path 22 to the first groove portion 41. As a result, a molten state of the shaping material and the discharge amount of the shaping material can be stabilized.

In the present embodiment, since the second groove portion 42 is spirally formed, a force for pressing the material MR in the form of pellet toward a barrel 50 side is stronger than in the case where the second groove portion is linearly formed. Therefore, the material can be supplied more stably between the rotor 40 and the barrel 50, and a conveying force for feeding a molten material to the through hole 56 can be increased. In the present embodiment, the second groove portion 42 is spirally formed, but the second groove portion 42 may be provided along the outer periphery of the rotor 40, or may be linearly formed.

In the present embodiment, since the material MR supplied to the second groove portion 42 can be cooled by the cooling mechanism 80, the material MR can be stably supplied between the groove forming surface 48 and the barrel 50 in a pellet state. Therefore, the material melted in the central portion 46 of the groove forming surface 48 can be stabilized from the through hole 56 of the barrel 50 to be pressure-fed. As a result, a variation in an injection amount of the material can be prevented. In the present embodiment, although the cooling mechanism 80 is formed by the cooling flow path 81 through which the refrigerant flows, the cooling mechanism 80 may be formed of a thermoelectric element such as a Peltier element.

In the present embodiment, since the cooling mechanism 80 is provided in the rotor case 31, the plasticization device 110 can have a simpler structure than a case of providing the cooling mechanism 80 inside the rotor 40.

Here, a material of the three-dimensional shaped object used in the three-dimensional shaping device 100 described above will be described. The three-dimensional shaping device 100 can use various materials such as a material having thermoplasticity, a metal material, and a ceramic material as a main material to form the three-dimensional shaped object. The "main material" means a central material for forming a shape of the three-dimensional shaped object, and means a material occupying a content of 50% by weight or more in the three-dimensional shaped object. The above shaping materials include those in which main materials are melted alone, and those in which some of the contained components are melted together with the main material to form a paste.

When the material having thermoplasticity is used as the main material, a shaping material is generated by plasticizing the material in the plasticization unit 30. The term "plasticize" means that the material having thermoplasticity is heated and melted.

For example, the following thermoplastic resin materials can be used as the material having thermoplasticity.

Example of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyetheretherketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyetheretherketone The material having thermoplasticity may contain an additive such as a pigment, a metal, a ceramic, a wax, a flame retardant, an antioxidant, and a heat stabilizer. The material having thermoplasticity is plasticized by the rotation of the rotor 40 and the heating of the first heating unit 58 and is then converted into a melted state in the plasticization unit 30. After the shaping material generated by melting the material having thermoplasticity is discharged from the nozzle 61, the shaping material is cured due to a reduction in temperature.

It is desirable that the material having thermoplasticity is injected from the nozzle 61 in a state where the material is heated to a temperature equal to or higher than a glass transition point thereof and is then in a completely melted state. For example, a glass transition point of an ABS resin is about 120° C., and it is desirable that the ABS resin is discharged from the nozzle 61 at about 200° C. In order to discharge the shaping material in such a high temperature state, a heater may be provided in a periphery of the nozzle 61.

The following metal materials, for example, may be used as the main material in the three-dimensional shaping device 100 instead of the above materials having thermoplasticity. In this case, it is desirable that a component to be melted at the time of generating the shaping material is mixed with a powder material obtained by converting the following metal material into powder, and then the mixture is charged into the plasticization unit 30 as the material MR.

Example of Metal Material

A single metal of magnesium (Mg), iron (Fe), cobalt (Co) or chromium (Cr), aluminum (Al), titanium (Ti), copper (Cu), and nickel (Ni), or an alloy containing one or more of these metals Example of Alloy Maraging steel, stainless steel, cobalt chrome molybdenum, titanium alloy, nickel alloy, aluminum alloy, cobalt alloy, and cobalt chromium alloy A ceramic material may be used as the main material in the three-dimensional shaping device 100 instead of the above metal material. As the ceramic material, for example, oxide ceramics such as silicon dioxide, titanium dioxide, aluminum oxide, and zirconium oxide, and non-oxide ceramics such as aluminum nitride can be used. When the metal material or the ceramic material as described above is used as the main material, the shaping material disposed on the table 210 may be cured by sintering.

The powder material of the metal material or the ceramic material charged into the material supply unit 20 as the material MR may be a mixed material obtained by mixing a plurality of types of powder including single metal powder, alloy powder, and ceramic material powder. The powder material of the metal material or the ceramic material may be coated with, for example, the thermoplastic resin shown above or another thermoplastic resin. In this case, the thermoplastic resin may be melted in the plasticization unit 30 to exhibit fluidity.

For example, the following solvents can be added to the powder material of the metal material or the ceramic material charged into the material supply unit 20 as the material MR. The solvent can be used alone or in combination of two or more selected from the following.

Example of Solvent

Water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates (such as tetrabutylammonium acetate), and ionic liquids such as butyl carbitol acetate In addition, for example, the following binders can be added to the powder material of the metal material or the ceramic material charged into the material supply unit 20 as the material MR.

Example of Binder

Figure 7:
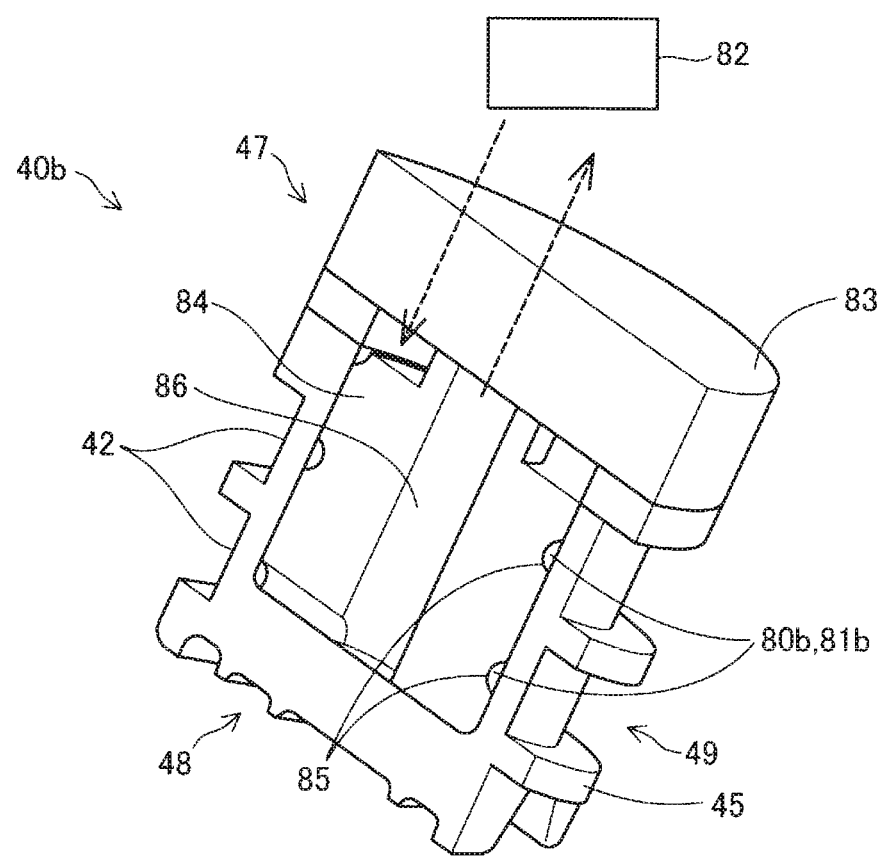
FIG. 7 is a perspective view showing a cross section of a rotor according to a second embodiment.

Acrylic resin, epoxy resin, silicone resin, cellulose resin or other synthetic resins, or polylactic acid (PLA), polyamide (PA), polyphenylene sulfide (PPS), polyetheretherketone (PEEK) or other thermoplastic resins B. Second Embodiment FIG. 7 is a perspective view showing a cross section of a rotor 40b according to a second embodiment. In the first embodiment described above, the cooling mechanism 80 is provided inside the rotor case 31, whereas in the second embodiment, a cooling mechanism 80b is provided inside the rotor 40b.

In the second embodiment, a rotary joint 83 is mounted to the upper surface 47 of the rotor 40b. The rotary joint 83 is a joint that conveys a fluid flowing through a fixed pipe to a flow path inside the rotor 40b that is a rotating body. In the present embodiment, the rotary joint 83 is coupled to the external pump 82, and conveys the refrigerant pressure-fed from the pump 82 into the rotor 40b.

In the present embodiment, the rotor 40b is formed in a bottomed cylindrical shape with an opening on an upper surface 47 side, and a columnar flow path forming member 84 is press-fitted therein. A third groove portion 85 communicating with the rotary joint 83 is provided along the second groove portion 42 formed in the rotor 40b on an outer periphery of the flow path forming member 84. In the present embodiment, since the second groove portion 42 is spirally formed, the third groove portion 85 is also spirally formed. A cooling flow path 81b as the cooling mechanism 80b is formed inside the rotor 40b by the third groove portion 85 formed in the flow path forming member 84 and a side wall of the rotor 40b. In the present embodiment, a communication hole 86 communicating with the rotary joint 83 is provided at a center of the flow path forming member 84. The third groove portion 85 and the communication hole 86 communicate with each other in a lower portion of the flow path forming member 84. Therefore, after the refrigerant flowing into the third groove portion 85 through the rotary joint 83 flows in the third groove portion 85 along the second groove portion 42, the refrigerant returns to the rotary joint 83 through the communication hole 86.

According to the second embodiment described above, since the cooling mechanism 80b is provided inside the rotor 40b, the side surface 49 of the rotor 40b can be directly cooled. Therefore, the cooling efficiency for the material MR can be increased. In the present embodiment, since the cooling mechanism 80b is formed along the second groove portion 42, the material MR in the second groove portion 42 can be efficiently cooled.

In the present embodiment, although the cooling mechanism 80b is formed along the second groove portion 42, the cooling mechanism 80b may not be provided along the second groove portion 42. For example, the cooling mechanism 80b may be formed to be surrounded by the side surface 49 of the rotor 40b. The cooling mechanism 80b may be formed along the flight portion 45 instead of the second groove portion 42.

The cooling mechanism 80 in the first embodiment and the cooling mechanism 80b in the second embodiment may be combined. That is, the cooling mechanism may be provided in both the rotor case 31 and the rotor 40.

C. Third Embodiment

Figure 8:
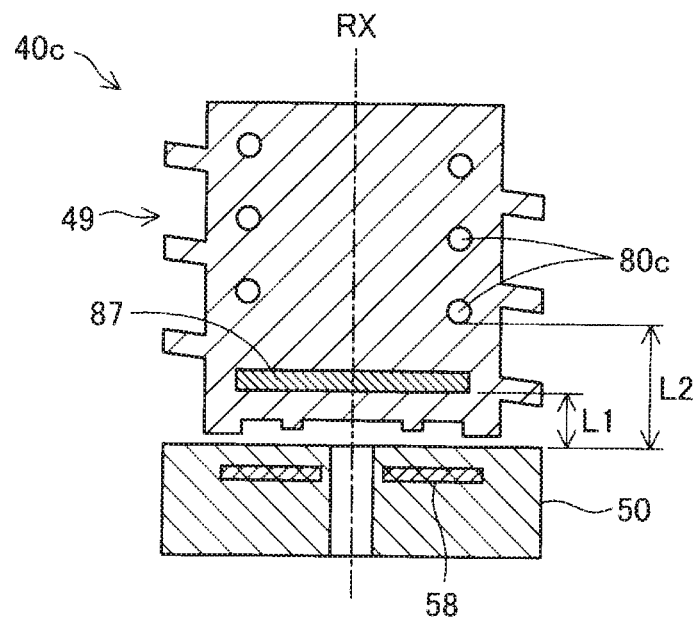
FIG. 8 is a cross-sectional view of a rotor according to a third embodiment.

FIG. 8 is a cross-sectional view of a rotor 40c according to a third embodiment. In the present embodiment, as in the second embodiment described above, a cooling mechanism 80c is provided inside the rotor 40c. In the present embodiment, a second heating unit 87 is further provided inside the rotor 40c. The second heating unit 87 is supplied with electric power from the outside by, for example, a rotary connector or a slip ring. The second heating unit 87 is controlled by the control unit 101.

In the present embodiment, a distance L1 from the barrel 50 to the second heating unit 87 along the rotation axis RX of the rotor 40c is shorter than a distance from the barrel 50 to the cooling mechanism 80c along the rotation axis RX of the rotor 40c. That is, the second heating unit 87 is disposed closer to the barrel 50 than the cooling mechanism 80c.

According to the third embodiment described above, the material MR can be efficiently melted by the first heating unit 58 provided in the barrel 50 and the second heating unit 87 provided in the rotor 40c while the side surface 49 of the rotor 40c is efficiently cooled by the cooling mechanism 80c.

D. Fourth Embodiment

Figure 9:
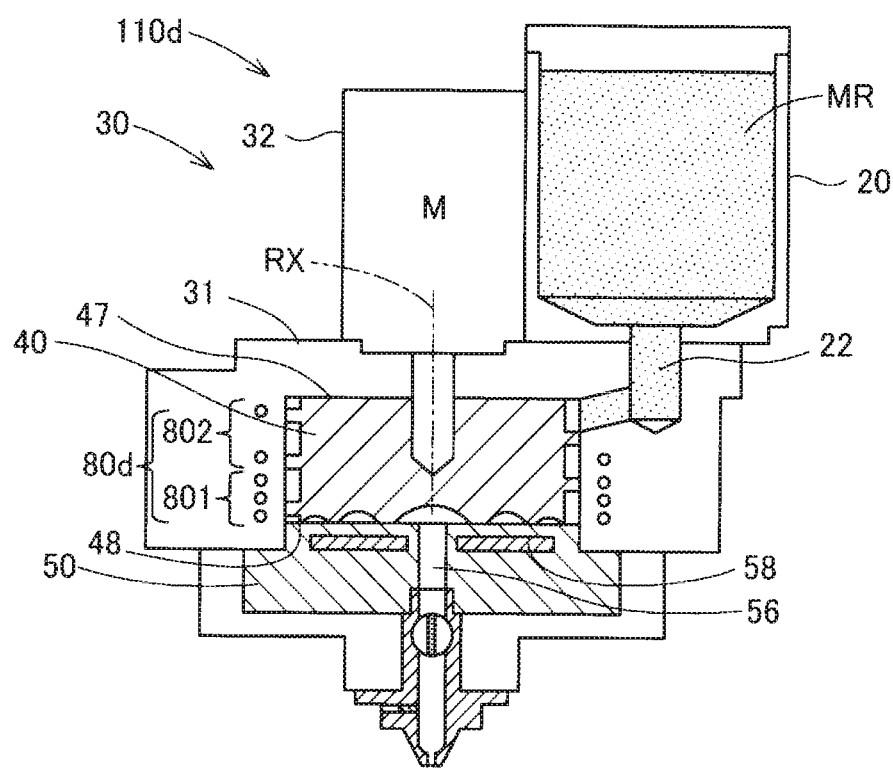
FIG. 9 is a diagram showing a schematic configuration of a plasticization device according to a fourth embodiment.

FIG. 9 is a diagram showing a schematic configuration of a plasticization device 110d according to a fourth embodiment. In the fourth embodiment, a cooling mechanism 80d is provided inside the rotor case 31. The cooling mechanism 80d includes a first portion 801 and a second portion 802. A distance from the barrel 50 to the first portion 801 along the rotation axis RX of the rotor is shorter than a distance from the barrel 50 to the second portion 802 along the rotation axis RX of the rotor 40. That is, in the first portion 801 and the second portion 802 constituting the cooling mechanism 80d, the first portion 801 is closer to the barrel 50 than the second portion 802. In the present embodiment, when the rotor 40 is divided into an upper portion and a lower portion at any desired position, the first portion 801 is a portion of the cooling mechanism 80d formed in the lower portion of the rotor 40, and the second portion 802 is a portion of the cooling mechanism 80d formed in the upper portion of the rotor 40.

In the present embodiment, the cooling mechanism 80d is implemented by a cooling flow path through which the refrigerant flows. A density of the cooling flow path in the first portion 801 is higher than a density of the cooling flow path in the second portion 802. That is, the density of the cooling flow path is higher as the position thereof is closer to the barrel 50. According to such a configuration, since the side surface 49 of the rotor 40 can be efficiently cooled at a position close to the barrel 50, the material MR can be stably maintained in the pellet state at the outer peripheral portion of the groove forming surface 48.

In the present embodiment, although the cooling mechanism 80d is provided inside the rotor case 31, the cooling mechanism 80d may be provided inside the rotor 40. That is, in the cooling mechanism inside the rotor 40, the density of the cooling flow path may be higher as the position thereof is closer to the barrel 50.

E. Fifth Embodiment

Figure 10:
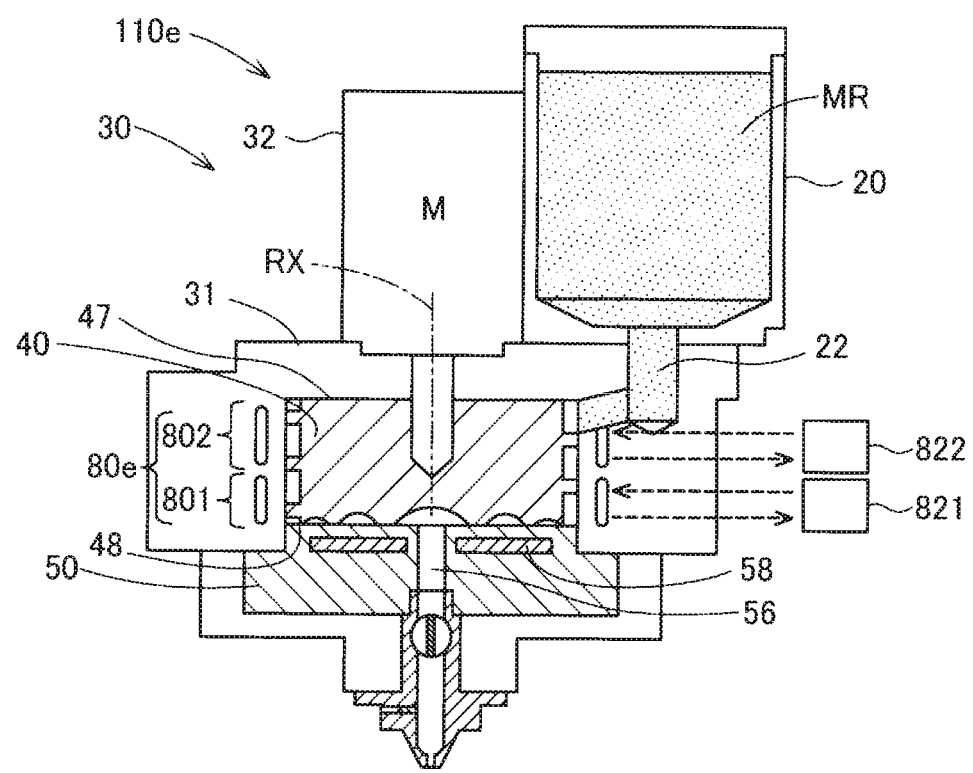
FIG. 10 is a diagram showing a schematic configuration of a plasticization device according to a fifth embodiment.

FIG. 10 is a diagram showing a schematic configuration of a plasticization device 110e according to a fifth embodiment. In the fifth embodiment, a cooling mechanism 80e is provided inside the rotor case 31. The cooling mechanism 80e includes the first portion 801 and the second portion 802. The distance from the barrel 50 to the first portion 801 along the rotation axis RX of the rotor 40 is shorter than the distance from the barrel 50 to the second portion 802 along the rotation axis RX of the rotor 40. That is, in the first portion 801 and the second portion 802 constituting the cooling mechanism 80e, the first portion 801 is closer to the barrel 50 than the second portion 802. In the present embodiment, when the rotor 40 is divided into the upper portion and the lower portion, the first portion 801 is a portion of the cooling mechanism 80e formed in the lower portion of the rotor 40, and the second portion 802 is a portion of the cooling mechanism 80e formed in the upper portion of the rotor 40.

In the present embodiment, the cooling mechanism 80e is implemented by a cooling flow path through which the refrigerant flows. A first pump 821 is coupled to the first portion 801, and a second pump 822 is coupled to the second portion 802. The first pump 821 and the second pump 822 are individually controlled by the control unit 101. Specifically, the control unit 101 controls the first pump 821 and the second pump 822 individually such that a temperature of a side surface portion of the rotor 40 cooled by the first portion 801 is lower than a temperature of a side surface portion of the rotor 40 cooled by the second portion 802. In the present embodiment, the control unit 101 controls the first pump 821 and the second pump 822 such that a flow rate of the refrigerant flowing through the first portion 801 is larger than a flow rate of the refrigerant flowing through the second portion 802 to make more heat exchange occur in the first portion 801 than in the second portion 802. According to such a configuration, since the side surface 49 of the rotor 40 can be efficiently cooled in the position close to the barrel 50, the material MR can be stably maintained in the pellet state at the outer peripheral portion of the groove forming surface 48.

In the present embodiment, although the cooling mechanism 80e is provided inside the rotor case 31, the cooling mechanism 80e may be provided inside the rotor 40. That is, the first portion 801 and the second portion 802 provided inside the rotor 40 may be individually controlled.

In the present embodiment, although the flow rate of the refrigerant flowing through the first portion 801 is larger than the flow rate of the refrigerant flowing through the second portion 802, a temperature of the refrigerant flowing through the first portion 801 may be lower than a temperature of the refrigerant flowing through the second portion 802. In addition, each of the first portion 801 and the second portion 802 may be implemented by a Peltier element instead of the cooling flow path, and the respective Peltier elements may be controlled such that the temperature of the side surface portion of the rotor 40 cooled by the first portion 801 is lower than the temperature of the side surface portion of the rotor 40 cooled by the second portion 802.

F. Sixth Embodiment

Figure 11:
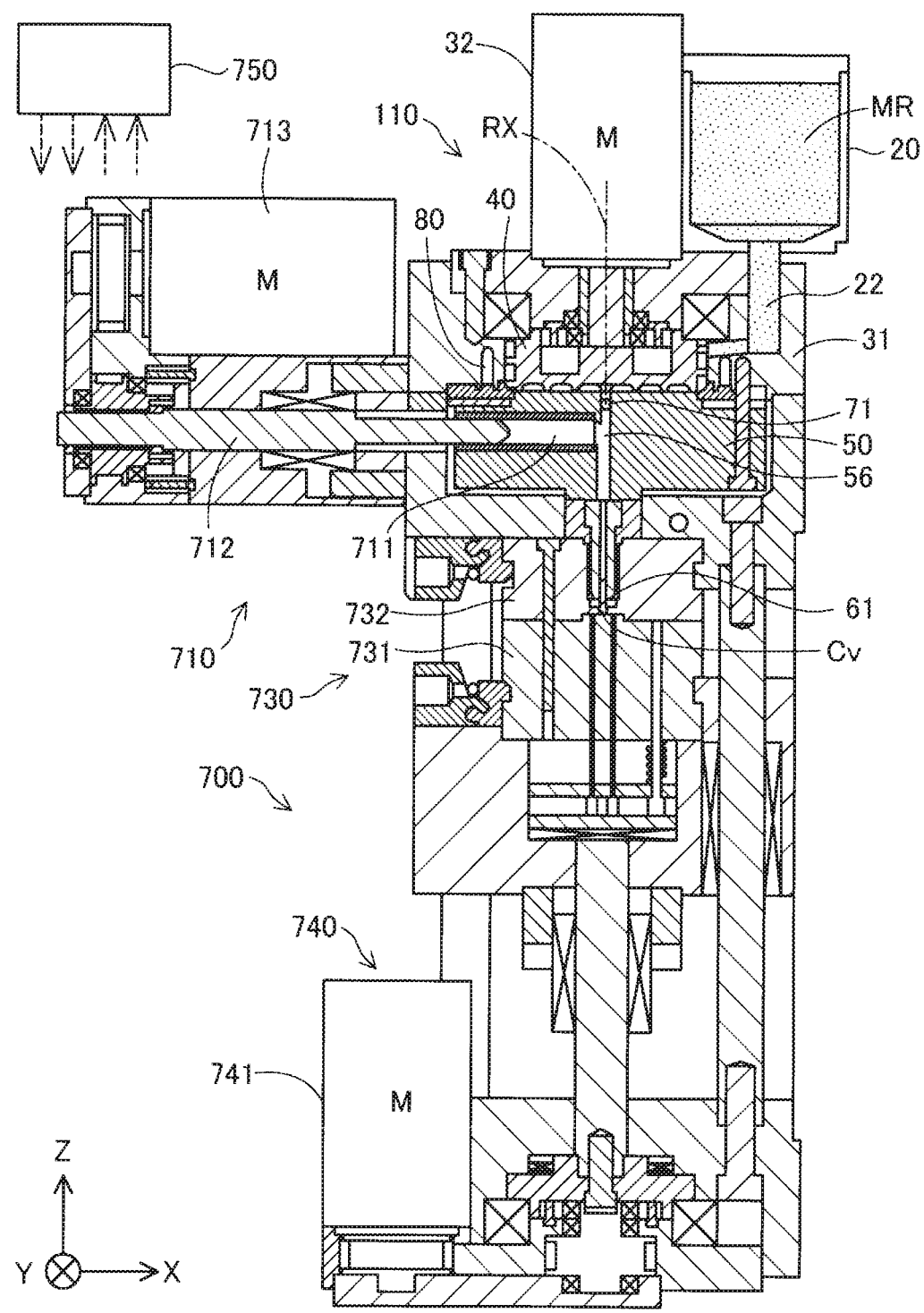
FIG. 11 is a diagram showing a schematic configuration of an injection molding device according to a sixth embodiment.

FIG. 11 is a diagram showing a schematic configuration of an injection molding device 700 according to a sixth embodiment of the present disclosure. The injection molding device 700 includes a plasticization device 110, an injection control mechanism 710, a mold 730, and a mold clamping device 740. The configuration of the plasticization device 110 is the same as that of the first embodiment unless otherwise specified. In the present embodiment, the same components as those in the first embodiment are denoted by the same reference numerals as in the first embodiment.

The plasticization device 110 includes the rotor 40, the barrel 50, and the nozzle 61. A heating unit (not shown) is embedded in the barrel 50. Similar to the first embodiment, the plasticization device 110 includes the cooling mechanism 80 for cooling the side surface of the rotor 40. An injection cylinder 711 to be described later is coupled to the through hole 56 of the barrel 50 of the present embodiment. A check valve 71 for preventing backflow of the shaping material from the injection cylinder 711 to the through hole 56 is provided between the through hole 56 and the injection cylinder 711. Under the control of a control unit 750, the plasticization device 110 plasticizes at least a part of the material supplied between the rotor 40 and the barrel 50, and generates the molten material in the form of paste having fluidity to guide the molten material from the through hole 56 to the injection control mechanism 710.

The injection control mechanism 710 includes the injection cylinder 711, a plunger 712, and a plunger drive unit 713. The injection control mechanism 710 has a function of injecting the molten material in the injection cylinder 711 into a cavity Cv to be described later. The injection control mechanism 710 controls an injection amount of the molten material from the nozzle 61 under the control of the control unit 750. The injection cylinder 711 is a substantially cylindrical member coupled to the through hole 56 of the barrel 50, and includes the plunger 712 therein. The plunger 712 slides inside the injection cylinder 711 and pressure-feeds the molten material in the injection cylinder 711 to the nozzle 61 included in the plasticization device 110. The plunger 712 is driven by the plunger drive unit 713 implemented by a motor.

The mold 730 includes a movable mold 731 and a fixed mold 732. The movable mold 731 and the fixed mold 732 face each other, and the cavity Cv that is a space corresponding to a shape of a molded object is provided between the movable mold 731 and the fixed mold 732. The molten material is pressure-fed to the cavity Cv by the injection control mechanism 710, and then is injected via the nozzle 61.

The mold clamping device 740 includes a mold drive unit 741, and has a function of opening and closing the movable mold 731 and the fixed mold 732. Under the control of the control unit 750, the mold clamping device 740 drives the mold drive unit 741 to move the movable mold 731 to open and close the mold 730.

Since the injection molding device 700 of the present embodiment described above includes the cooling mechanism 80 similar to that of the first embodiment, it is possible to stably supply the material between the rotor 40 and the barrel 50. Therefore, it is possible to inject the material in a stable molten state with respect to the mold 730. Any form from the first embodiment to the fifth embodiment can be applied to the form of the cooling mechanism 80 in the sixth embodiment.

G. Other Aspects (G-1) In the third embodiment, both the first heating unit 58 provided in the barrel 50 and the second heating unit 87 provided in the rotor 40c are provided. In contrast, the second heating unit 87 may be provided and the first heating unit 58 may not be provided. Even in this case, the material MR can be sufficiently melted by the second heating unit 87.

(G-2) The present disclosure is not limited to the embodiments described above, and can be implemented by various configurations without departing from the scope of the present disclosure. For example, in order to solve some or all of problems described above, or to achieve some or all of effects described above, technical characteristics in the embodiments corresponding to technical characteristics in aspects described below can be replaced or combined as appropriate. If the technical characteristics are not described as essential in the present description, they can be deleted as appropriate.

(1) According to a first aspect of the present disclosure, a plasticization device is provided. The plasticization device includes: a rotor rotated by a drive motor and having a groove forming surface in which a first groove portion is formed along a rotation direction; a rotor case configured to accommodate the rotor; a barrel facing the groove forming surface and having a through hole; a first heating unit configured to heat the rotor or the barrel; and a cooling mechanism configured to cool a side surface of the rotor, in which a material supplied between the first groove portion and the barrel is plasticized by rotation of the rotor and heating by the first heating unit to flow out from the through hole, and the side surface of the rotor has a material guiding port configured to guide the material to the first groove portion, and a second groove portion configured to feed the material supplied between the rotor and the rotor case to the material guiding port.

According to such an aspect, since the second groove portion is provided on the side surface of the rotor and the material supplied to the second groove portion can be cooled by the cooling mechanism, the material MR can be stably supplied between the groove forming surface and the barrel in a pellet state. Therefore, a variation in an injection amount of the material can be prevented.

(2) In the plasticization device according to the above aspect, the cooling mechanism may be provided inside the rotor case. According to such an aspect, it is possible to provide a simpler structure than a case of providing the cooling mechanism inside the rotor.

(3) In the plasticization device according to the above aspect, the cooling mechanism may be provided inside the rotor. According to such an aspect, since the side surface of the rotor can be directly cooled, the cooling efficiency can be increased.

(4) In the plasticization device according to the above aspect, the cooling mechanism may be disposed along the second groove portion. According to such a configuration, the material in the second groove portion can be efficiently cooled.

(5) In the plasticization device according to the above aspect, the rotor may include a second heating unit therein, and a distance from the barrel to the second heating unit along a rotation axis of the rotor may be shorter than a distance from the barrel to the cooling mechanism along the rotation axis of the rotor. According to such a configuration, the material between the rotor and the barrel can be efficiently melted by the first heating unit and the second heating unit while the side surface of the rotor is cooled by the cooling mechanism.

(6) In the plasticization device according to the above aspect, the cooling mechanism may include a first portion and a second portion, a distance from the barrel to the first portion along a rotation axis of the rotor may be shorter than a distance from the barrel to the second portion along the rotation axis of the rotor, the cooling mechanism includes a cooling flow path through which a refrigerant flows, and a density of the cooling flow path in the first portion may be higher than a density of the cooling flow path in the second portion. According to such a configuration, the side surface of the rotor can be efficiently cooled at a portion close to the barrel.

(7) In the plasticization device according to the above aspect, the cooling mechanism may include a first portion and a second portion, a distance from the barrel to the first portion along a rotation axis of the rotor may be shorter than a distance from the barrel to the second portion along the rotation axis of the rotor, and the first portion and the second portion may be individually controllable such that a temperature of a side surface portion of the rotor cooled by the first portion is lower than a temperature of a side surface portion of the rotor cooled by the second portion. According to such a configuration, the side surface of the rotor can be efficiently cooled at a portion close to the barrel.

(8) In the plasticization device according to the above aspect, the cooling mechanism may include a cooling flow path through which a refrigerant flows. According to such a configuration, the side surface of the rotor can be cooled by the refrigerant.

The present disclosure is not limited to the above-described plasticization device, but may be implemented as various forms such as a three-dimensional shaping device and an injection molding device.

What is claimed is:

1. A plasticization device comprising:
    a rotor rotated by a drive motor and having a groove forming surface in which a first groove portion is formed along a rotation direction;
    a rotor case configured to accommodate the rotor;
    a barrel facing the groove forming surface and having a through hole;
    a first heating unit configured to heat the rotor or the barrel; and
    a cooling mechanism configured to cool a side surface of the rotor, wherein
    a material supplied between the first groove portion and the barrel is plasticized by rotation of the rotor and heating by the first heating unit to flow out from the through hole, and
    the side surface of the rotor has
        a material guiding port configured to guide the material to the first groove portion, and
        a second groove portion configured to feed the material supplied between the rotor and the rotor case to the material guiding port.

2. The plasticization device according to claim 1, wherein the cooling mechanism is provided inside the rotor case.

3. The plasticization device according to claim 1, wherein the cooling mechanism is provided inside the rotor.

4. The plasticization device according to claim 1, wherein the cooling mechanism is disposed along the second groove portion.

5. The plasticization device according to claim 1, wherein the rotor includes a second heating unit therein, and
a distance from the barrel to the second heating unit along a rotation axis of the rotor is shorter than a distance from the barrel to the cooling mechanism along the rotation axis of the rotor.

6. The plasticization device according to claim 1, wherein the cooling mechanism includes a first portion and a second portion,
a distance from the barrel to the first portion along a rotation axis of the rotor is shorter than a distance from the barrel to the second portion along the rotation axis of the rotor,
the cooling mechanism includes a cooling flow path through which a refrigerant flows, and
a density of the cooling flow path in the first portion is higher than a density of the cooling flow path in the second portion.

7. The plasticization device according to claim 1, wherein the cooling mechanism includes a first portion and a second portion,
a distance from the barrel to the first portion along a rotation axis of the rotor is shorter than a distance from the barrel to the second portion along the rotation axis of the rotor, and
the first portion and the second portion are individually controllable such that a temperature of a side surface portion of the rotor cooled by the first portion is lower than a temperature of a side surface portion of the rotor cooled by the second portion.

8. The plasticization device according to claim 1, wherein the cooling mechanism includes a cooling flow path through which a refrigerant flows.

9. A three-dimensional shaping device comprising:
the plasticization device according to claim 1; and
a nozzle communicating with the through hole and configured to discharge a plasticized material toward a table.

10. An injection molding device comprising:
the plasticization device according to claim 1; and
a nozzle communicating with the through hole and configured to inject a plasticized material to a mold.

* * * * *